(12) United States Patent
Lin

(10) Patent No.: US 10,670,181 B2
(45) Date of Patent: Jun. 2, 2020

(54) MOUNTING UNIT, ASSEMBLY FRAME USING THE SAME, AND METHOD OF MANUFACTURING THE SAME

(71) Applicant: Yen-Cheng Lin, Taichung (TW)

(72) Inventor: Yen-Cheng Lin, Taichung (TW)

( * ) Notice: Subject to any disclaimer, the term of this patent is extended or adjusted under 35 U.S.C. 154(b) by 0 days.

(21) Appl. No.: 16/111,647

(22) Filed: Aug. 24, 2018

(65) Prior Publication Data
US 2019/0063673 A1 Feb. 28, 2019

(30) Foreign Application Priority Data
Aug. 24, 2017 (TW) .............................. 106128788 A

(51) Int. Cl.
| | |
|---|---|
| *F16M 13/02* | (2006.01) |
| *F16M 11/24* | (2006.01) |
| *B21D 28/24* | (2006.01) |
| *F16B 17/00* | (2006.01) |
| *E04B 2/74* | (2006.01) |
| *E04B 1/58* | (2006.01) |

(52) U.S. Cl.
CPC ............. *F16M 13/02* (2013.01); *B21D 28/24* (2013.01); *F16B 17/00* (2013.01); *F16M 11/24* (2013.01); *E04B 2001/5881* (2013.01); *E04B 2002/749* (2013.01)

(58) Field of Classification Search
CPC ....... B21D 28/24; A47B 91/02; A47B 91/022; A47B 91/024; A47B 91/026; A47B 91/028; A47B 91/16; A47B 2220/0027; A47B 2220/003; A47B 2220/0033; F25D 2323/0011; F16M 2200/08; F16M 11/24; F16M 13/02; F16B 17/00; E04B 2001/5881; E04B 2002/749
See application file for complete search history.

(56) References Cited

U.S. PATENT DOCUMENTS

| | | | | |
|---|---|---|---|---|
| 3,175,795 | A | * 3/1965 | Adams ................. | A47B 91/024 248/188.4 |
| 3,228,646 | A | * 1/1966 | Lane ....................... | E04G 25/04 248/354.3 |
| 3,288,418 | A | * 11/1966 | Hinrichs ................ | E04B 2/824 52/632 |
| 3,771,466 | A | * 11/1973 | Ferdinand .............. | A47B 57/42 108/109 |

(Continued)

*Primary Examiner* — Christopher Garft
(74) *Attorney, Agent, or Firm* — Muncy, Geissler, Olds & Lowe, P.C.

(57) ABSTRACT

A mounting unit includes: a bottom portion having first and second surfaces; a cylinder portion centrally disposed at the bottom portion, protruding from the first or second surface, and having a first screw hole; two abutting walls disposed at edges of the bottom portion edge and extending toward the first surface; two lugs disposed at edges of the bottom portion and extending toward the second surface to connect to different sides thereof, respectively. The lugs each have a second screw hole. An assembly frame using the mounting unit includes: a frame having a T-shaped slot insertable by the lugs; at least a second screwing element and second screw holes of the lugs couple together the mounting unit and the frame; and a screw coupled to the first screw hole of the cylinder portion of the mounting unit. A method of manufacturing a mounting unit is further provided.

6 Claims, 18 Drawing Sheets

(56) References Cited

U.S. PATENT DOCUMENTS 5,901,523 A * 5/1999 Tasi ................. A47B 57/54
                                                                  248/223.41
6,601,353 B2 * 8/2003 Gabriele ............ E05F 7/06
                                                                  248/188.4

* cited by examiner

MOUNTING UNIT, ASSEMBLY FRAME USING THE SAME, AND METHOD OF MANUFACTURING THE SAME

BACKGROUND OF THE INVENTION

1. Technical Field

The present disclosure relates to mounting devices and, more particularly, to a mounting unit, an assembly frame using the same, and a method of manufacturing the same.

2. Description of Related Art

Every known mounting unit is usually formed by processing a bulky material; doing so not only produces plenty of waste but also incurs high processing costs. Both casting and die casting incur high die manufacturing costs and take much time, not to mention that there is room for improvement in structural strength and manufacturing techniques. As a result, assembly frames formed by putting together the known mounting units not only incur high costs but also take so long to manufacture that they fail to meet demand quickly.

BRIEF SUMMARY OF THE INVENTION

In order to achieve the above and other objectives, the present disclosure provides a mounting unit, comprising: a bottom portion having a first surface and a second surface; a cylinder portion centrally disposed at the bottom portion, protruding from a side of the first surface or a side of second surface, and having a first screw hole; at least two abutting walls disposed at edges of the bottom portion and extending toward the first surface; and at least two lugs disposed at the edges of the bottom portion and extending toward the second surface to connect to different sides thereof, respectively. The lugs each have a second screw hole.

Alternatively, a mounting unit comprises: a bottom portion having a first surface and a second surface; a cylinder portion centrally disposed at the bottom portion, protruding toward a side of the first surface or a side of second surface, and having a first screw hole; and at least two lugs disposed at the edges of the bottom portion and extending toward the second surface to connect to different sides thereof, respectively, wherein the lugs each have a second screw hole.

Preferably, an inward dented portion dented in the direction of the cylinder portion is formed at each said abutting wall.

In view of the aforesaid drawbacks of the prior art, it is an objective of the present disclosure to provide an assembly frame using the mounting unit. The assembly frame is not only easy and quick to assemble but also has sufficient support strength.

In order to achieve the above and other objectives, the present disclosure provides an assembly frame using the mounting unit, comprising: a frame having a T-shaped slot insertable by the lugs of the mounting unit; at least a second screwing element operating in conjunction with second screw holes of the lugs to couple together the mounting unit and the frame; and a screw coupled to the first screw hole of the cylinder portion of the mounting unit.

Preferably, the assembly frame comprises a nut screwedly disposed at the screw and abutting directly or indirectly against abutting walls of the mounting unit.

Preferably, the assembly frame comprises an end cover for covering a first surface of the mounting unit, the end cover having a surface portion, a cylindrical hole and a lateral portion, the cylindrical hole being penetrable by the screw.

In view of the aforesaid drawbacks of the prior art, it is an objective of the present disclosure to provide a method of manufacturing a mounting unit. The method is advantageously effective in enhancing ease of manufacturing, simplifying structures, and reducing required materials.

In order to achieve the above and other objectives, the present disclosure provides a method of manufacturing a mounting unit, comprising the steps of: providing a board having a first surface and a second surface; forming a cylinder portion and at least two abutting walls on the first surface of the board; forming a lug on the second surface of the board; and forming a screw hole in the lug.

Preferably, an inward dented portion dented in the direction of the cylinder portion is formed at each said abutting wall.

Preferably, the step of forming the cylinder portion is preceded by forming a pre-withdrawal hole by stamping and forming a lug hole in the lug by stamping.

Preferably, the abutting walls and the lugs are simultaneously formed in the same instance of a stamping process.

In view of the aforesaid drawbacks of the prior art, it is an objective of the present disclosure to provide an assembly frame which is not only easy and quick to assemble but also has sufficient support strength.

DETAILED DESCRIPTION OF THE INVENTION

The present disclosure is illustrated by preferred embodiments, depicted by accompanying drawings and described below.

Figure 1:
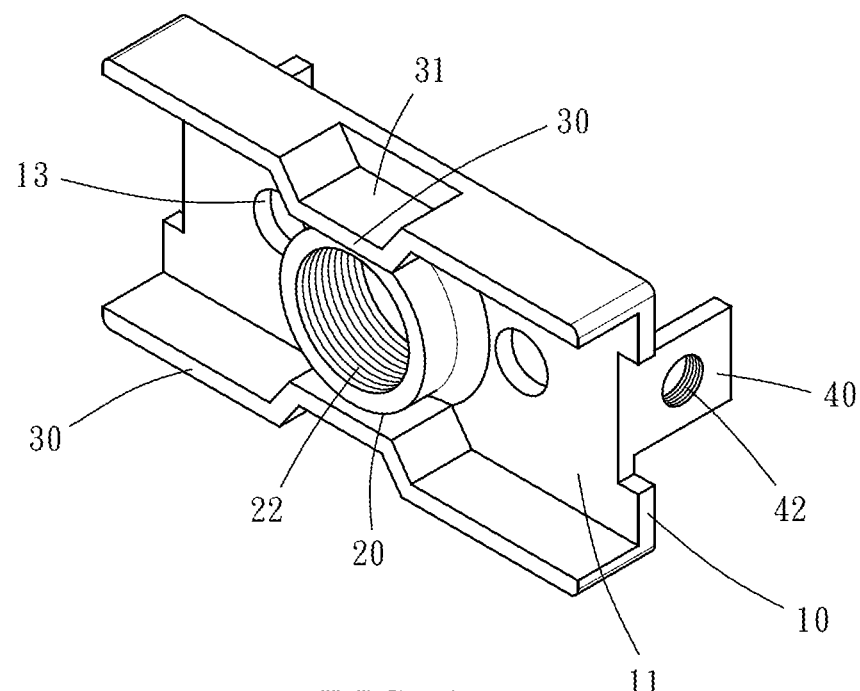
FIG. 1 is a perspective view of a mounting unit from an angle according to a preferred embodiment of the present disclosure.
Figure 2:
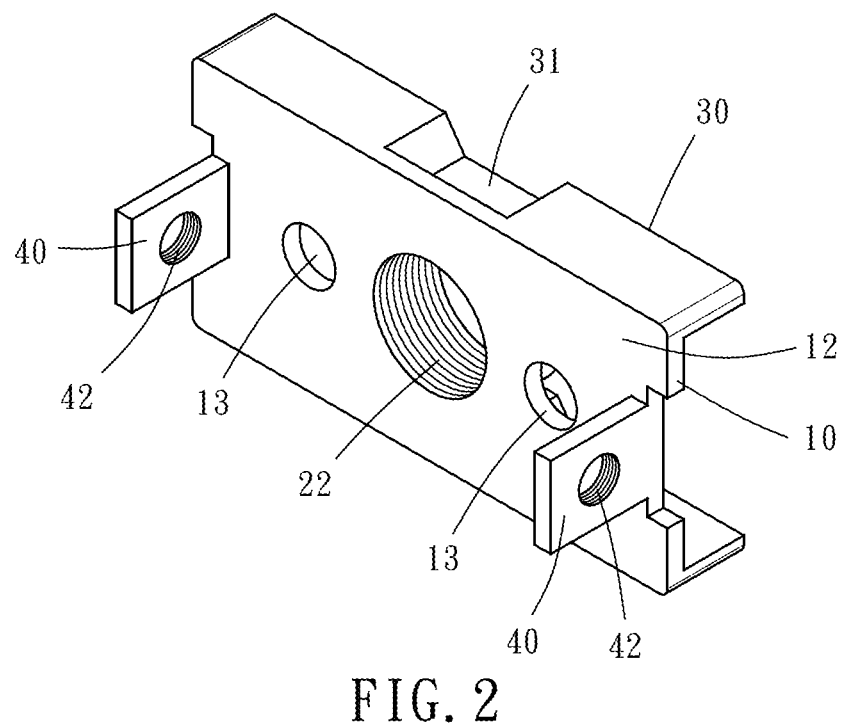
FIG. 2 is a perspective view of the mounting unit from another angle according to a preferred embodiment of the present disclosure.

As shown in FIG. 1 and FIG. 2, a mounting unit 1 provided by the present disclosure comprises a bottom portion 10, a cylinder portion 20, abutting walls 30, and two lugs 40.

The bottom portion 10 has a first surface 11, a second surface 12 and two holes 13.

The cylinder portion 20 is centrally disposed at the bottom portion 10 and protrudes from one side of the first surface 11 or one side of the second surface 12. The cylinder portion 20 has a first screw hole 22.

The abutting walls 30 are disposed at edges of the bottom portion 10 and extend toward the first surface 11. An inward dented portion 31 is, connectedly or separately, disposed at least one end of each abutting wall 30 and corresponds in position to the cylinder portion 20.

The two lugs 40 are disposed at the edges of the bottom portion 10 and extend toward the second surface 12 to connect to different sides thereof, respectively. The lugs 40 each have a second screw hole 42.

Therefore, this embodiment achieves the objectives of the present disclosure.

Figure 3:
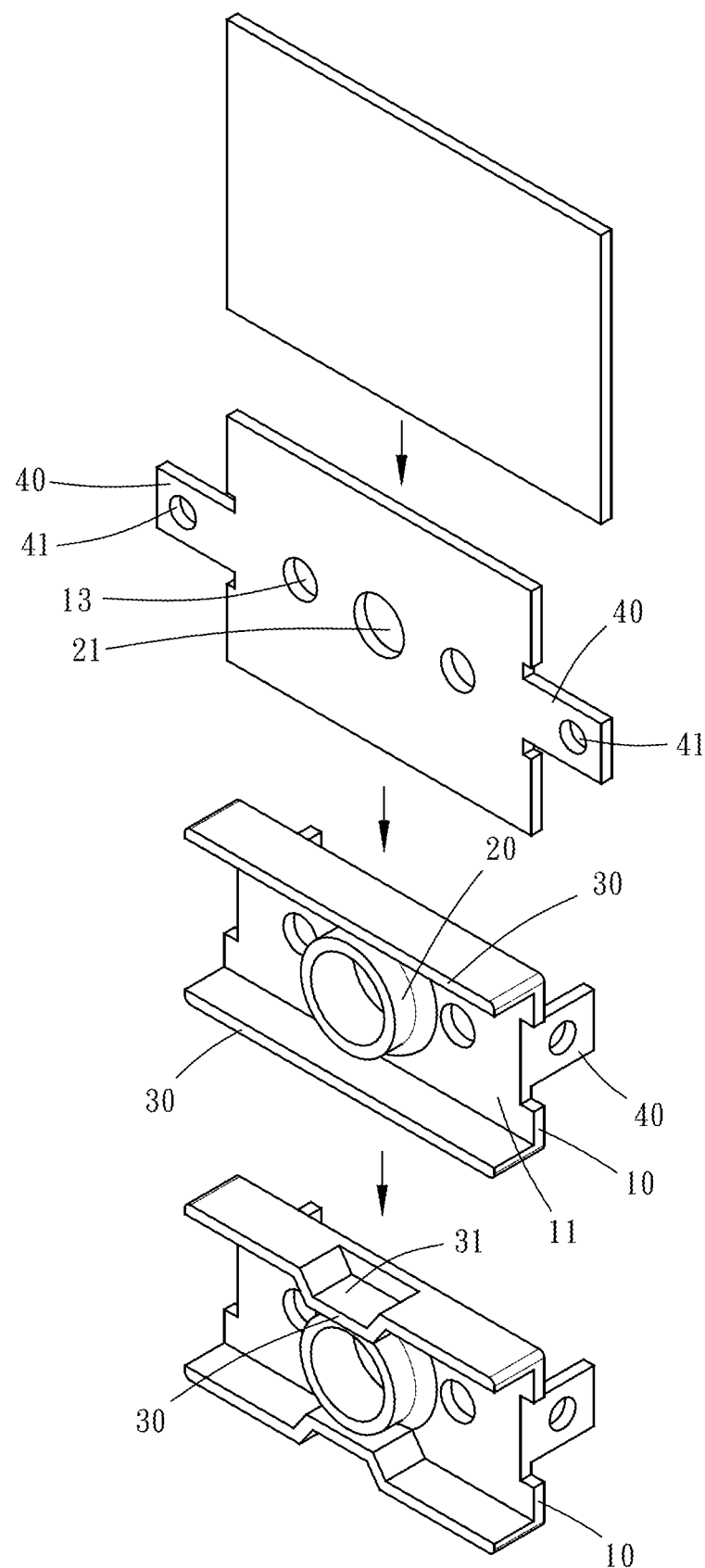
FIG. 3 is a schematic view of the process flow of a method of manufacturing the mounting unit according to a preferred embodiment of the present disclosure.

As shown in FIG. 3, a method of manufacturing a mounting unit 1 according to the present disclosure comprises the steps of:

providing a board 10 having a first surface 11 and a second surface 12;

forming a cylinder portion 20 and at least two abutting walls 30 on the first surface 11 of the board 10;

forming a lug 40 on the second surface 12 of the board 10; and forming a screw hole 42 in the lug 40;

wherein an inward dented portion 31 dented in the direction of the cylinder portion 20 is formed at each said abutting wall 30;

wherein the step of forming the cylinder portion 20 is preceded by forming a pre-withdrawal hole 21 by stamping and forming a lug hole 41 in the lug 40 by stamping.

The abutting walls 30 and the lugs 40 are simultaneously formed in the same instance of a stamping process.

Therefore, this embodiment achieves the objectives of the present disclosure.

Figure 4:
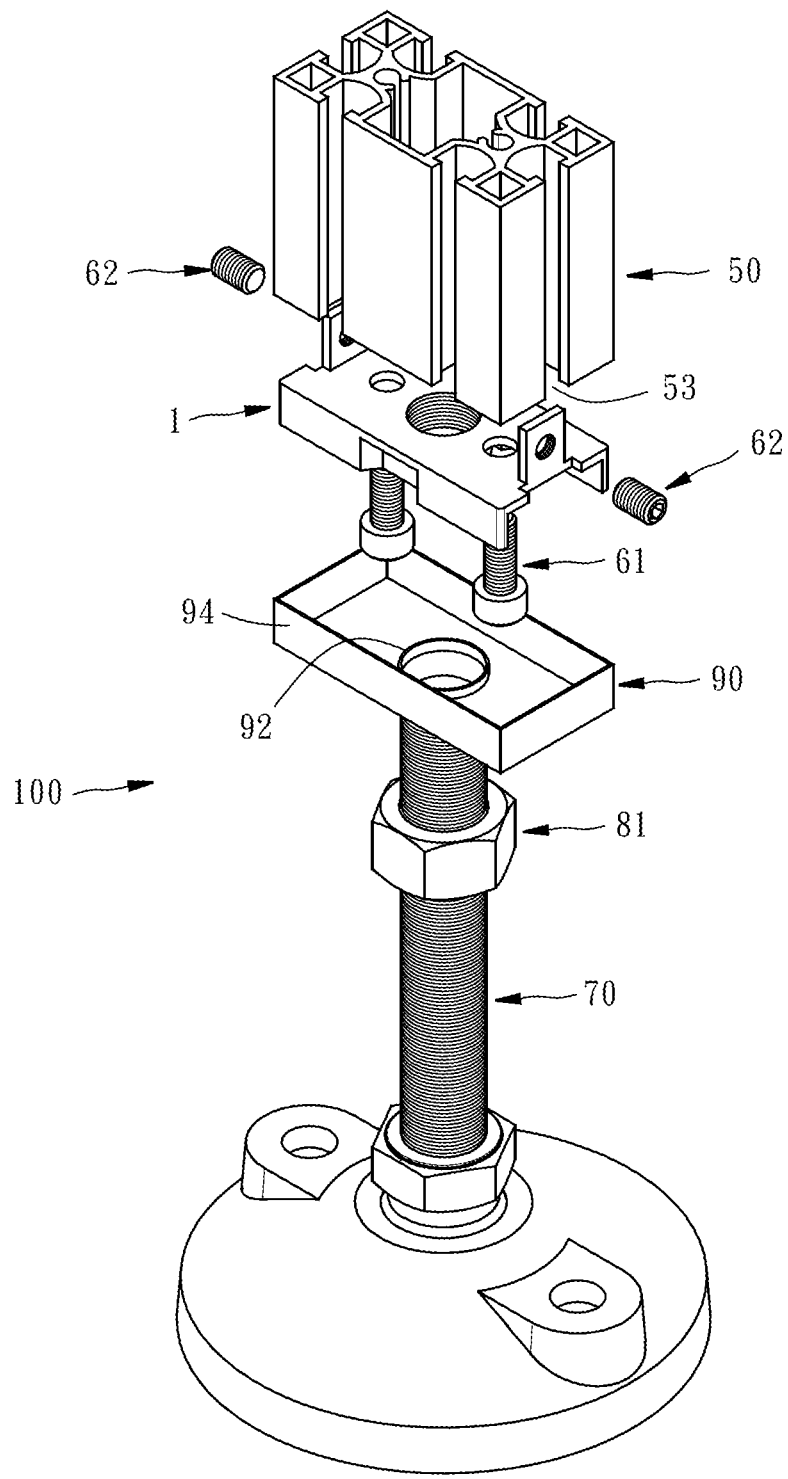
FIG. 4 is an exploded view of a assembly frame from an angle according to a preferred embodiment of the present disclosure.
Figure 5:
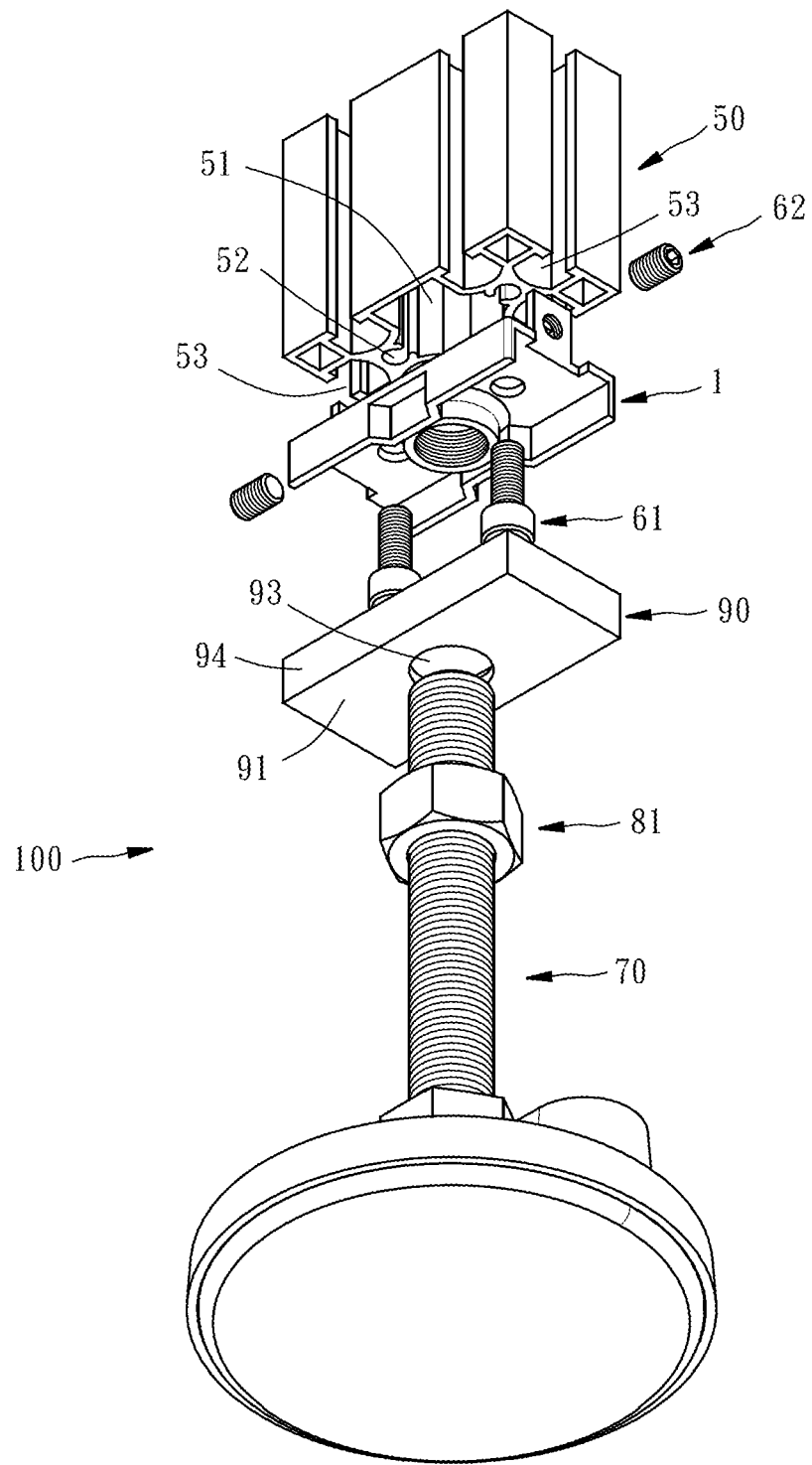
FIG. 5 is an exploded view of the assembly frame from another angle according to a preferred embodiment of the present disclosure.
Figure 6:
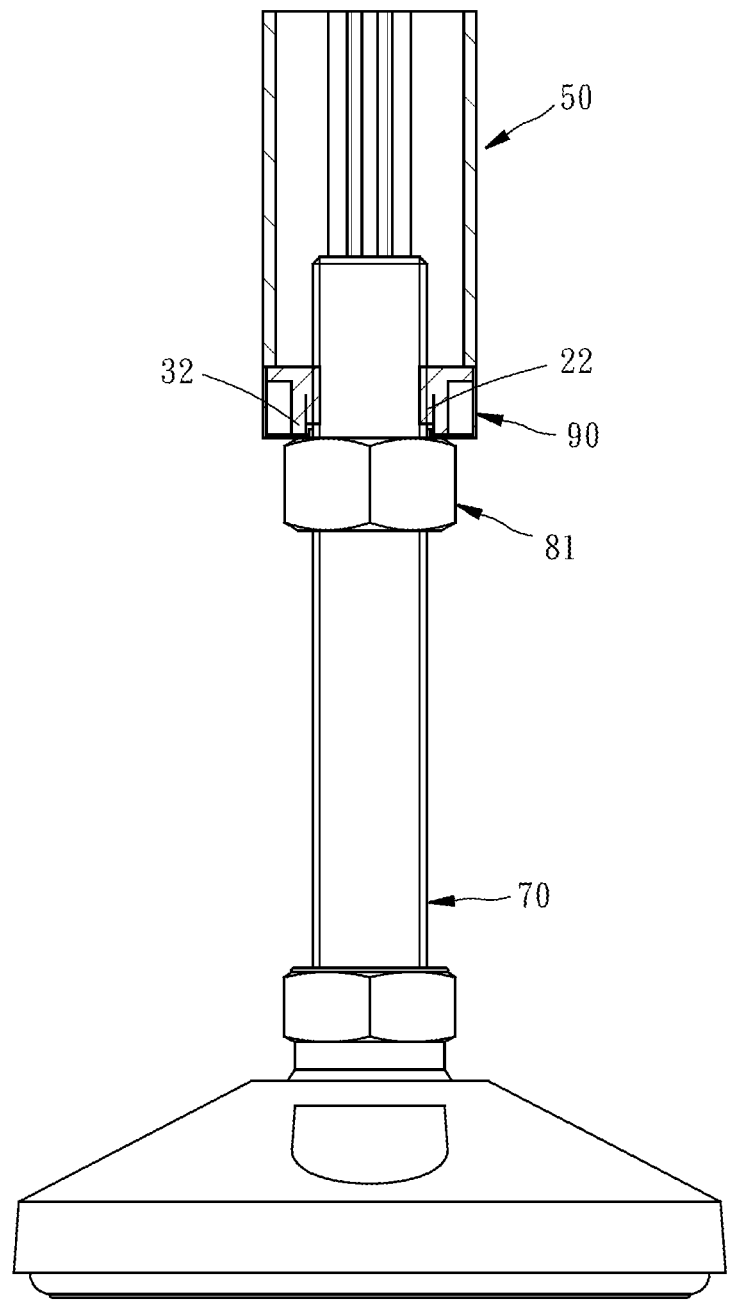
FIG. 6 is a cross-sectional view of the assembled assembly frame according to a preferred embodiment of the present disclosure.

As shown in FIG. 3 through FIG. 5, an assembly frame 100 using the mounting unit 1 according to the present disclosure comprises the mounting unit 1, a frame 50, two second screwing elements 62 and second screw holes 42 of the lugs 40, and a screw 70.

The frame 50 has a receiving hole 51, a fastening hole 52, and a T-shaped slot 53 which the lugs 40 of the mounting unit 1 are inserted into.

The two second screwing element 62 and the second screw holes 42 of the lugs 40 operate in conjunction to couple together the mounting unit 1 and frame 50.

The screw 70 is coupled to the first screw hole 22 of the cylinder portion 20 of the mounting unit 1.

The assembly frame 100 further comprises an end cover 90 for covering the first surface 11 of the mounting unit 1. The end cover 90 has a surface portion 91, a cylindrical wall 92, a cylindrical hole 93 and a lateral portion 94. The cylindrical hole 93 is penetrable by the screw 70.

A nut 81 is screwedly disposed at the screw 70. A washer 82 is fittedly disposed between the nut 81 and the end cover 90.

In this embodiment, upon completion of assembly, the nut 81 abuts against abutting walls 30 of the mounting unit 1 indirectly through the end cover 90.

Therefore, the nut 81 of variable size abuts against the abutting walls 30 of the inward dented portion 31 of the mounting unit 1 to attain stable screwing.

Therefore, this embodiment achieves the objectives of the present disclosure.

In this embodiment, the end cover 90 is dispensed with, whereas the nut 81 directly abuts against the abutting walls 30 of the mounting unit 1.

Figure 7:
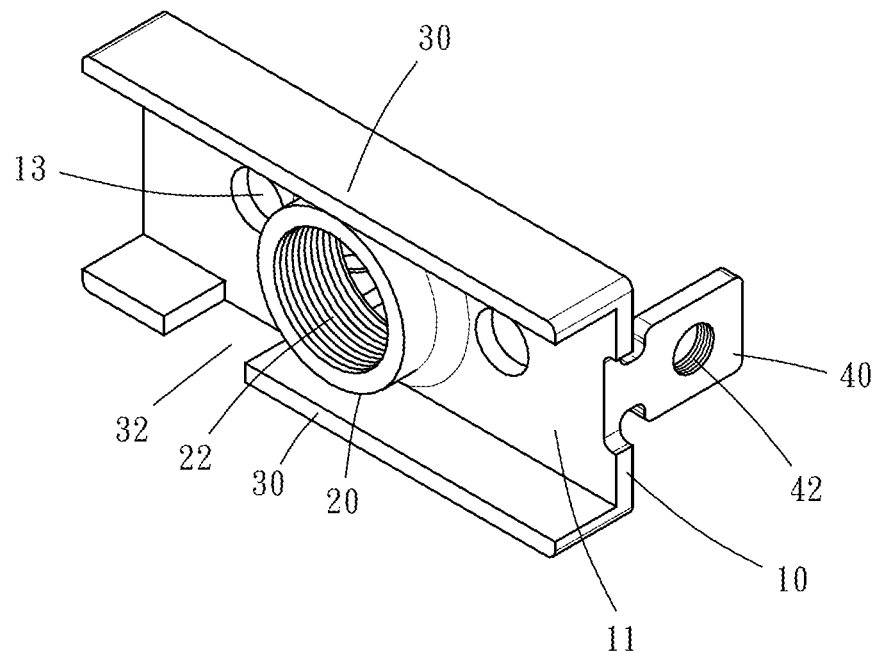
FIG. 7 is a perspective view of the mounting unit from an angle according to a preferred embodiment of the present disclosure.
Figure 8:
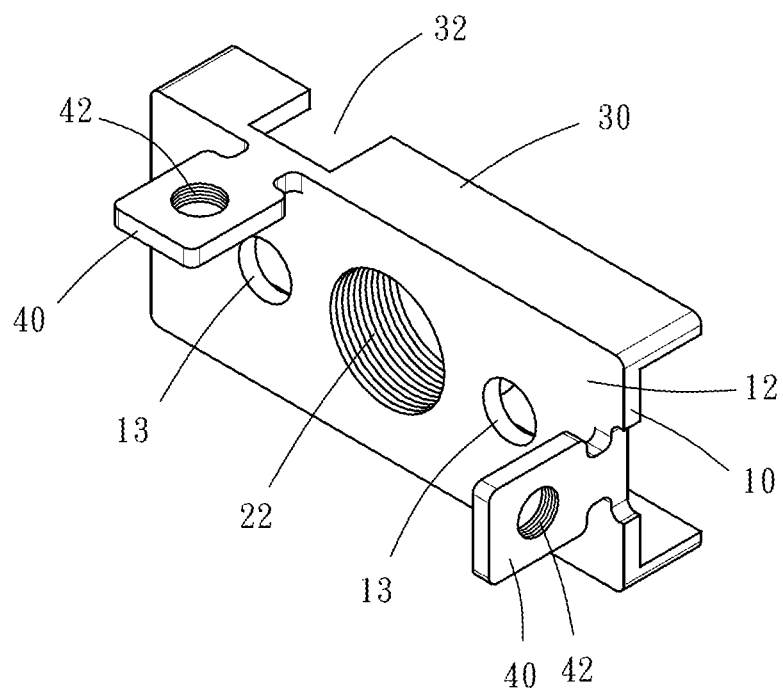
FIG. 8 is a perspective view of the mounting unit from another angle according to a preferred embodiment of the present disclosure.

As shown in FIG. 7 and FIG. 8, another mounting unit 1 provided by the present disclosure comprises a bottom portion 10, a cylinder portion 20, abutting walls 30 and two lugs 40.

The bottom portion 10 has a first surface 11, a second surface 12 and two holes 13.

The cylinder portion 20 is centrally disposed at the bottom portion 10 and protrudes from one side of the first surface 11 or one side of the second surface 12. The cylinder portion 20 has a first screw hole 22.

The abutting walls 30 are disposed at the edges of the bottom portion 10 and extend toward the first surface 11. A notch 32 is disposed between the abutting walls 30.

The two lugs 40 are disposed at the edges of the bottom portion 10 and extend toward the second surface 12 to connect to different sides thereof, respectively. The lugs 40 each have a second screw hole 42.

In this embodiment, the lugs 40 correspond in position to the notch 32 of the abutting walls 30.

Therefore, this embodiment achieves the objectives of the present disclosure.

Figure 21:
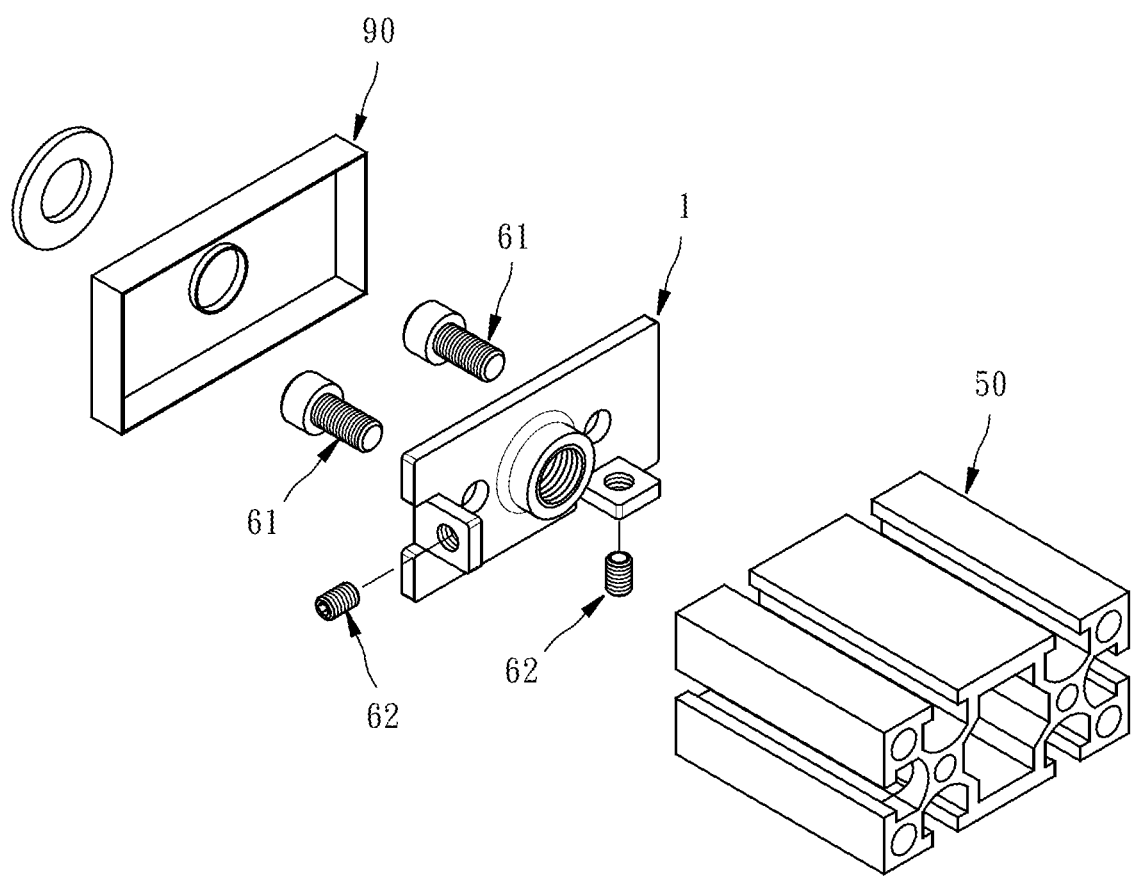
FIG. 21 is a schematic view based on FIG. 20 from another angle.

As shown in FIG. 21, a method of manufacturing a mounting unit 1 according to the present disclosure comprises the steps of:

providing a board 10 having a first surface 11 and a second surface 12;

forming a cylinder portion 20 and at least two abutting walls 30 on the first surface 11 of the board 10 forming a lug 40 on the second surface 12 of the board 10; and forming a screw hole 42 in the lug 40;

wherein the step of forming the cylinder portion 20 is preceded by forming a pre-withdrawal hole 21 by stamping and forming a lug hole 41 in the lug 40 by stamping;

wherein the abutting walls 30 and the lugs 40 are simultaneously formed in the same instance of a stamping process.

Therefore, this embodiment achieves the objectives of the present disclosure.

Figure 9:
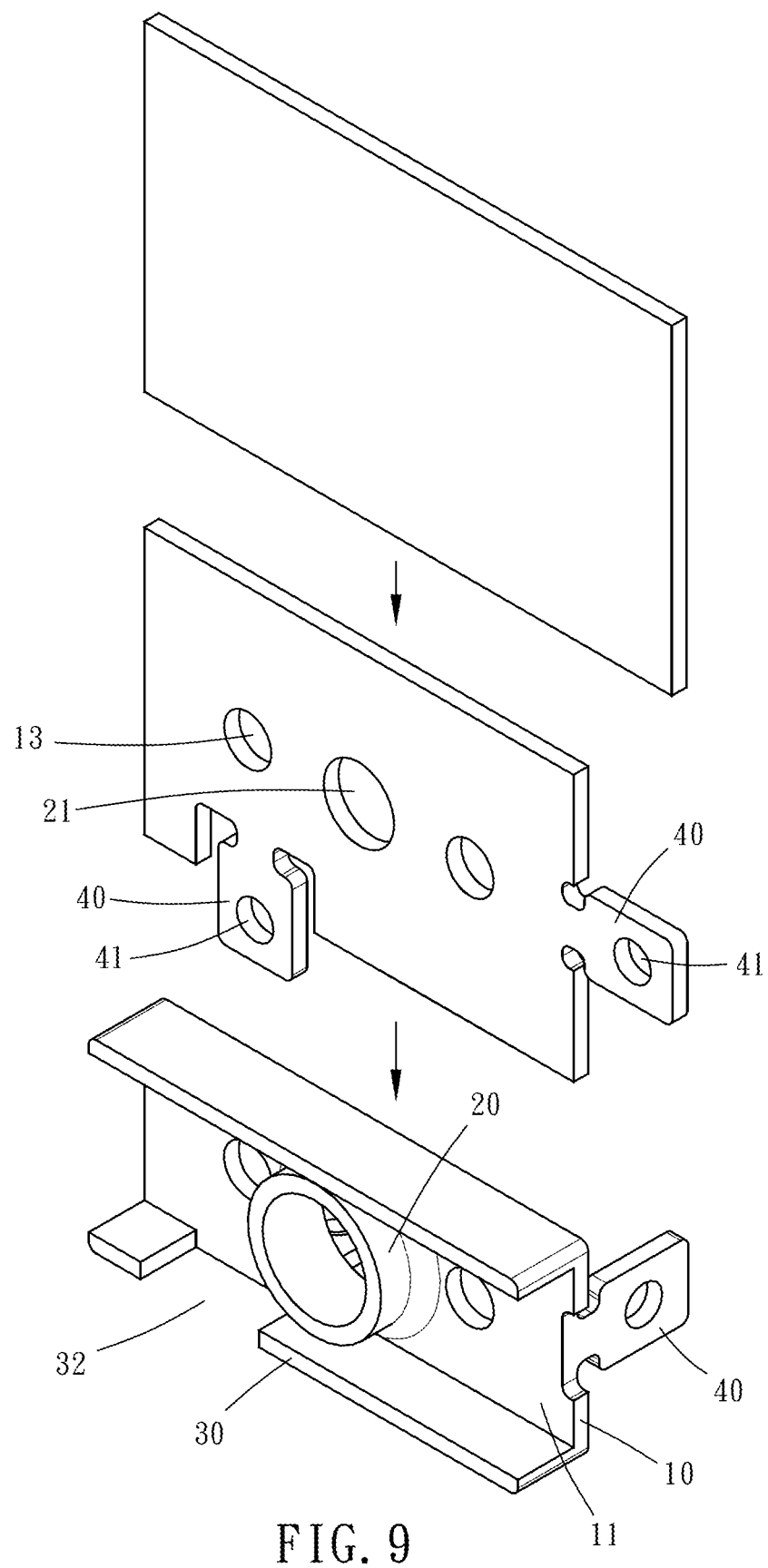
FIG. 9 is a schematic view of the process flow of a method of manufacturing a mounting unit according to a preferred embodiment of the present disclosure.
Figure 10:
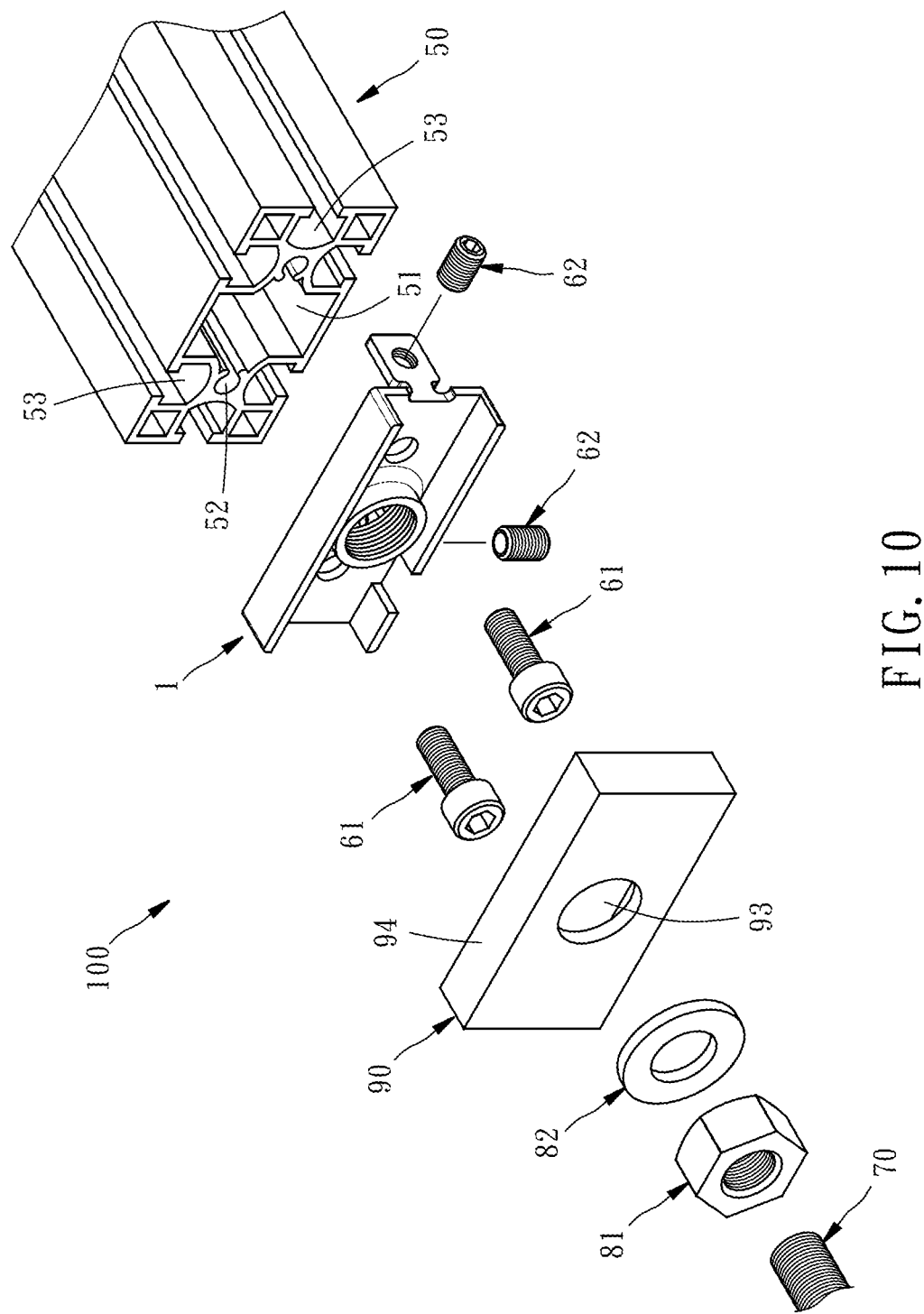
FIG. 10 is an exploded view of an assembly frame from an angle according to a preferred embodiment of the present disclosure.
Figure 11:
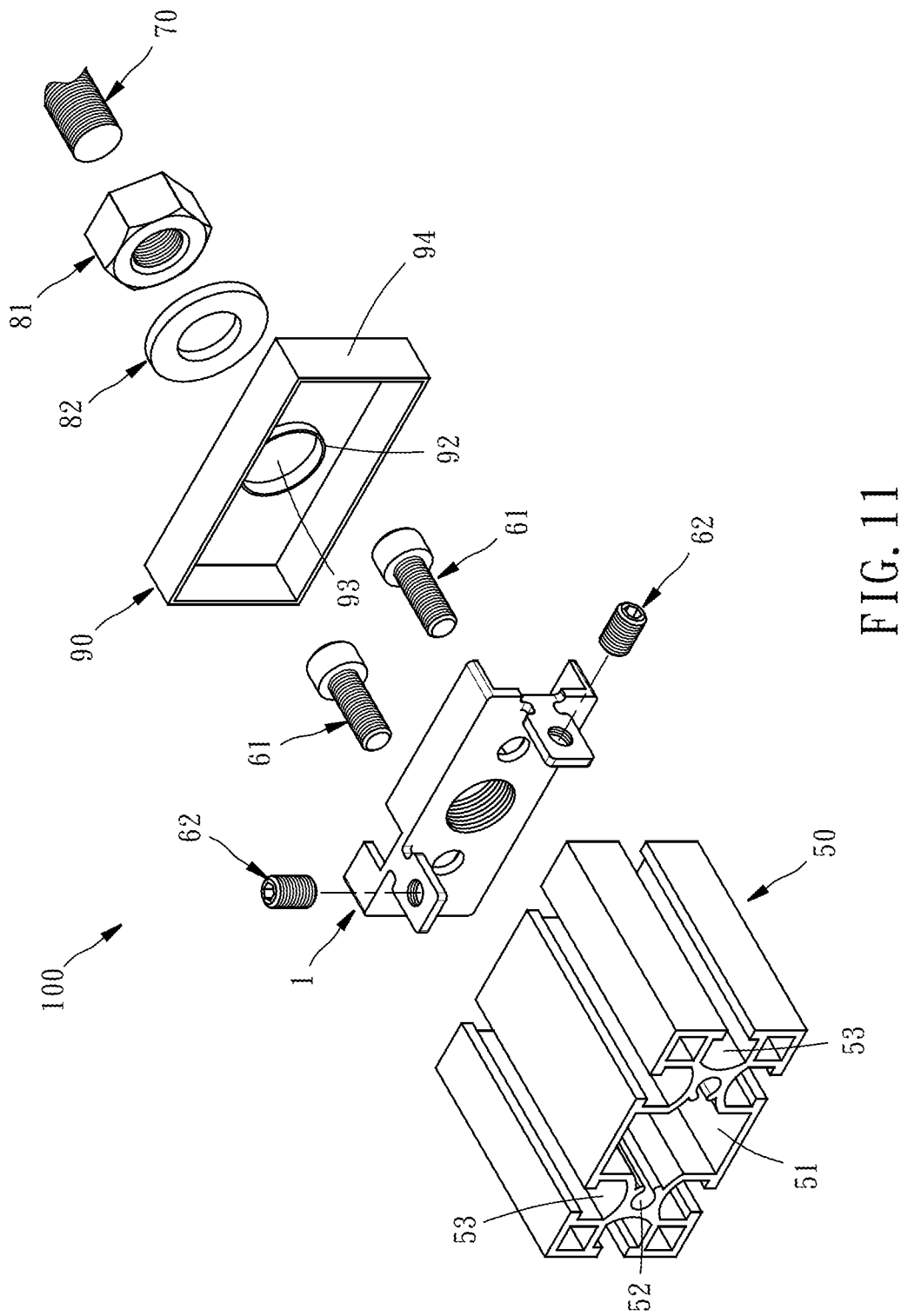
FIG. 11 is an exploded view of the assembly frame from another angle according to a preferred embodiment of the present disclosure.
Figure 12:
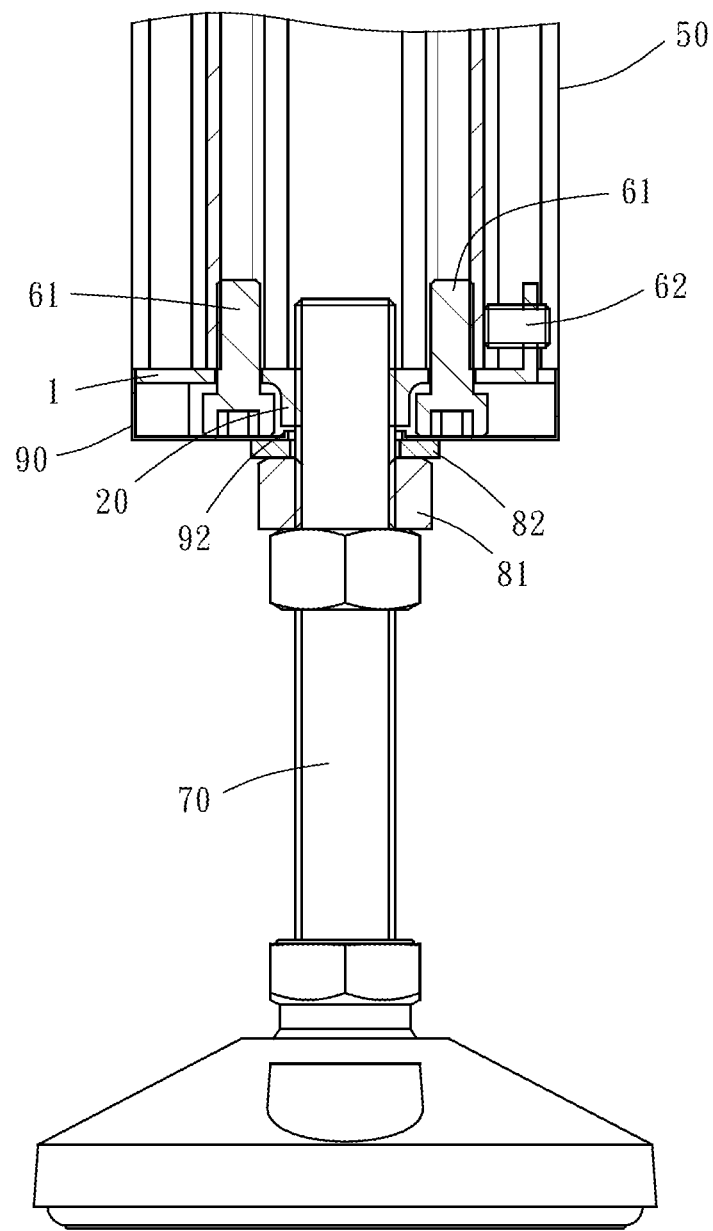
FIG. 12 is a cross-sectional view of the assembled assembly frame according to a preferred embodiment of the present disclosure.

As shown in FIG. 9 through FIG. 11, an assembly frame 100 using the mounting unit 1 according to the present disclosure comprises the mounting unit 1, a frame 50, two second screwing elements 62, and a screw 70.

The frame 50 has a receiving hole 51, a fastening hole 52, and a T-shaped slot 53 which the lugs 40 of the mounting unit 1 are inserted into.

The two second screwing elements 62 and the second screw holes 42 of the lugs 40 operate in conjunction to couple together the mounting unit 1 and the frame 50.

The screw 70 is coupled to the first screw hole 22 of the cylinder portion 20 of the mounting unit 1.

The assembly frame 100 further comprises an end cover 90 for covering the first surface 11 of the mounting unit 1. The end cover 90 has a surface portion 91, a cylindrical wall 92, a cylindrical hole 93 and a lateral portion 94. The cylindrical hole 93 is penetrable by the screw 70.

A nut 81 is screwedly disposed at the screw 70. A washer 82 is fittedly disposed between the nut 81 and the end cover 90.

In this embodiment, upon completion of assembly, the nut 81 abuts against the abutting walls 30 of the mounting unit 1 indirectly through the end cover 90.

Therefore, this embodiment achieves the objectives of the present disclosure.

Figure 13:
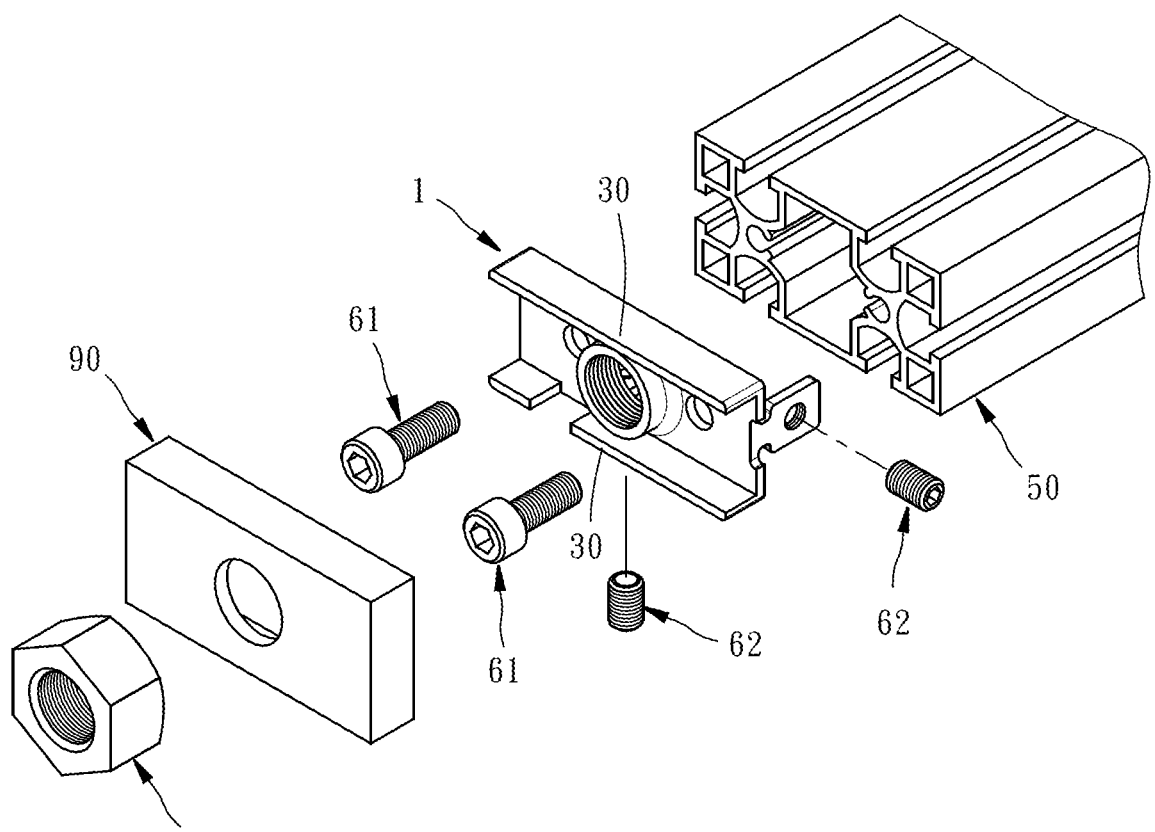
FIG. 13 is a schematic view of the preceding embodiment of the present disclosure, but dispensing with a washer.

As shown in FIG. 13, this embodiment is substantially identical to the preceding embodiment in terms of an assembly frame 100 using the mounting unit 1, except that this embodiment dispenses with the washer 82.

Figure 14:
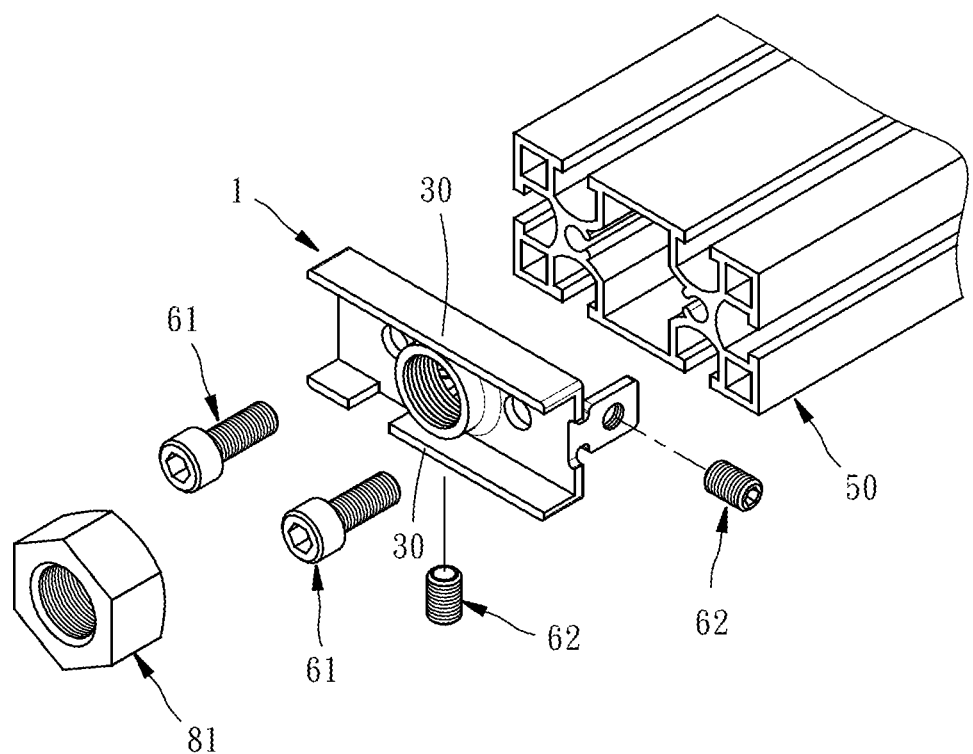
FIG. 14 is a schematic view of the preceding embodiment of the present disclosure, but dispensing with a washer and an end cover.

As shown in FIG. 14, this embodiment is substantially identical to the preceding embodiment in terms of an assembly frame 100 using the mounting unit 1, except that this embodiment dispenses with the washer 82 and an end cover 90.

Figure 15:
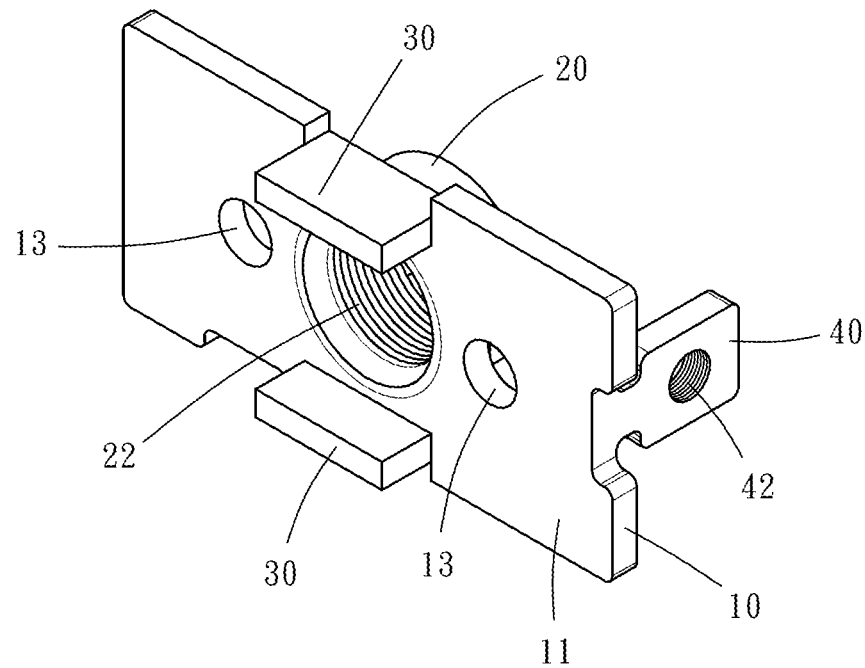
FIG. 15 is a perspective view of another mounting unit from an angle according to a preferred embodiment of the present disclosure.
Figure 16:
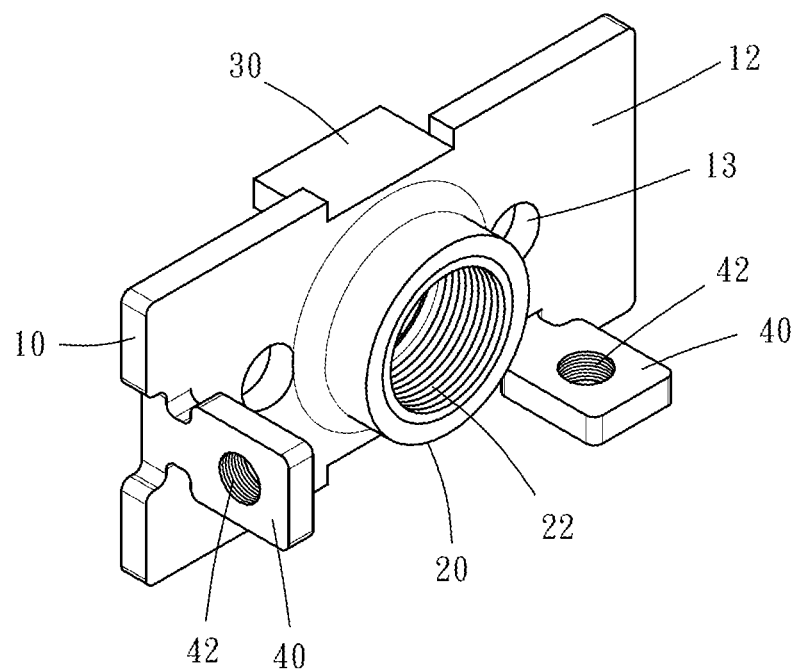
FIG. 16 is a perspective view of another mounting unit from another angle according to a preferred embodiment of the present disclosure.

As shown in FIG. 15 and FIG. 16, a mounting unit 1 of this embodiment is substantially identical to the mounting unit 1 of the preceding embodiment except for the technical features described below.

The cylinder portion 20 protrudes toward the first surface 11 or the second surface 12. The abutting walls 30 are disposed at the edges of the bottom portion 10 and extend toward the first surface 11.

Therefore, this embodiment achieves the objectives of the present disclosure.

Figure 17:
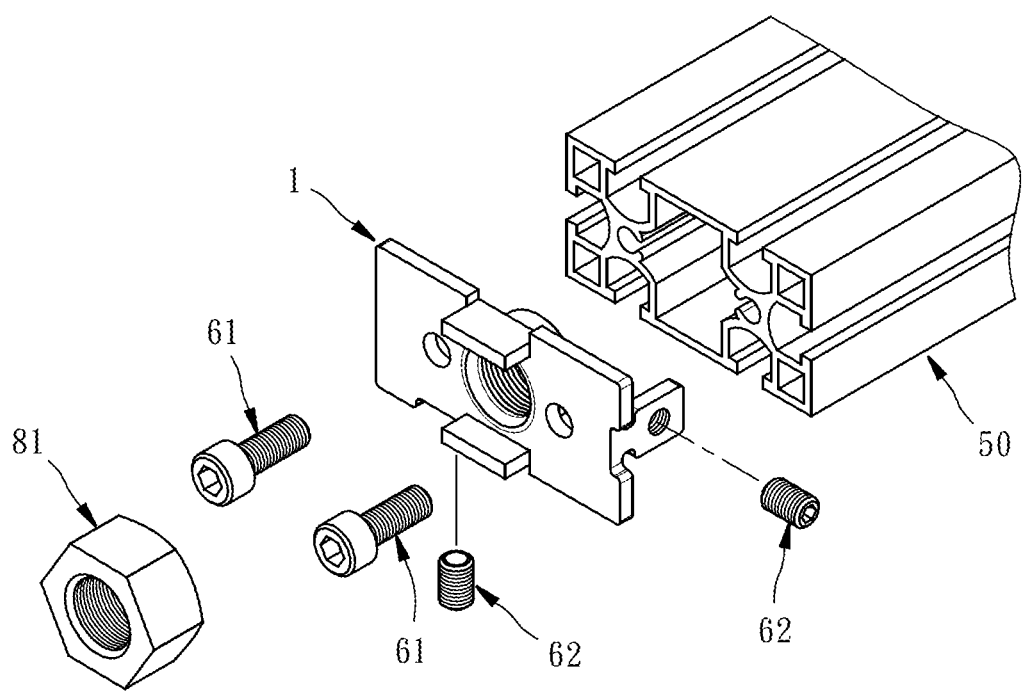
FIG. 17 is an exploded view of an assembly frame of another mounting unit from an angle according to a preferred embodiment of the present disclosure.
Figure 18:
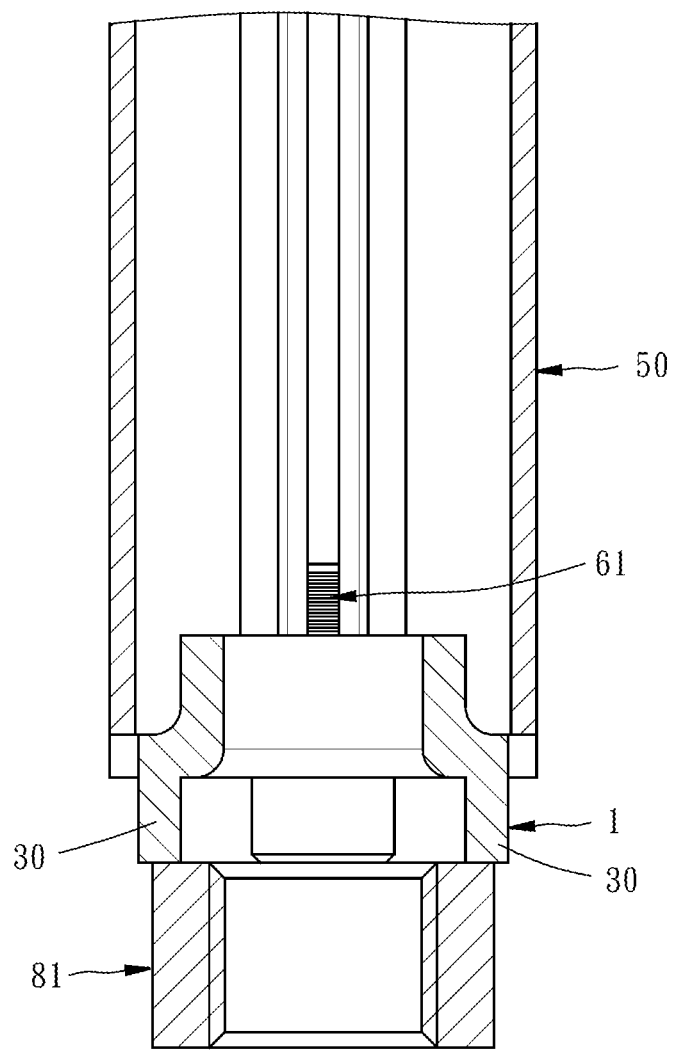
FIG. 18 is a cross-sectional view of the assembled assembly frame of FIG. 17.

As shown in FIG. 17 and FIG. 18, an assembly frame 100 using the mounting unit 1 according to the present disclosure comprises a screw 70, a frame 50, and at least a second screwing element 62.

The screw 70 is coupled to the first screw hole 22 of the cylinder portion 20 of the mounting unit 1.

The frame 50 has a T-shaped slot 53 penetrable by the lugs 40 of the mounting unit 1.

The at least a second screwing element 62 operates in conjunction with the second screw holes 42 of the lugs 40 to couple together the mounting unit 1 and the frame 50.

Therefore, this embodiment achieves the objectives of the present disclosure.

Figure 19:
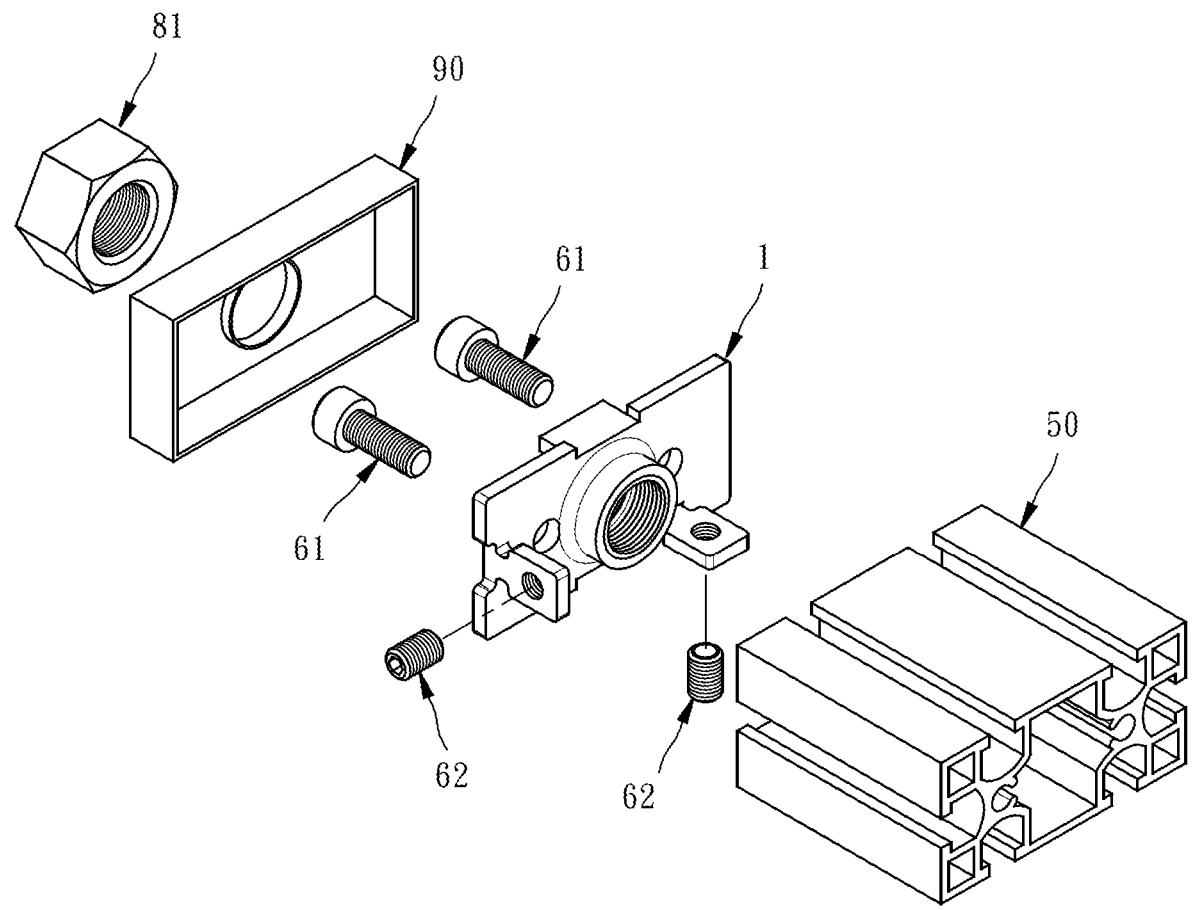
FIG. 19 is an exploded view of the assembly frame, exclusive of an end cover, according to the preceding embodiment of the present disclosure.

As shown in FIG. 19, this embodiment is substantially identical to the preceding embodiment in terms of an assembly frame 100 using the mounting unit 1 except for the following differences.

The assembly frame 100 further comprises an end cover 90 for covering the first surface 11 of the mounting unit 1. The end cover 90 has a surface portion 91, a cylindrical wall 92, a cylindrical hole 93 and a lateral portion 94. The cylindrical hole 93 is penetrable by the screw 70.

In this embodiment, upon completion of assembly, the nut 81 abuts against the abutting walls 30 of the mounting unit 1 indirectly through the end cover 90.

Figure 20:
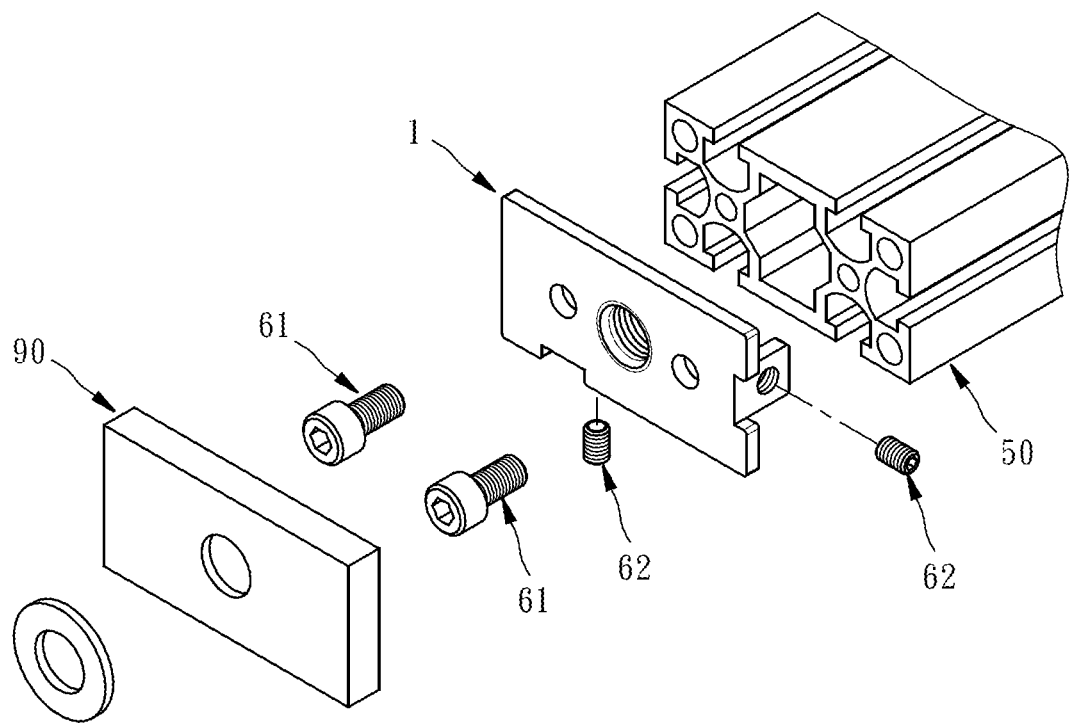
FIG. 20 is a schematic view of the mounting unit, exclusive of an assembly frame, according to the preceding embodiment of the present disclosure.

As shown in FIG. 20 and FIG. 21, the mounting unit 1 of this embodiment is substantially identical to the mounting unit 1 of the preceding embodiment except for the following differences.

The mounting unit 1 dispenses with the abutting walls 30. The mounting unit 1 and the assembly frame 100 using the same achieve the objective of the present disclosure.

In addition to the above exemplary embodiments, the present disclosure can be implemented in the ways described below.

For instance, regarding the assembly frame 100, the edges of the end cover 90 abut against the end portion of the frame 50.

Alternatively, the first screw hole 22 is not necessarily formed at the cylinder portion 20 but is provided in the form of a screw hole of a nut.

Therefore, the present disclosure proves to be effective in enhancing ease of manufacturing, simplifying structures, and reducing required materials of the mounting unit 1, the assembly frame 100 using the same, and a method of manufacturing the same, thereby achieving the objectives of the present disclosure.

The present disclosure is disclosed above by preferred embodiments. It should be understood that persons skilled in the art can think of various amendments and variations to the preferred embodiments of the present disclosure without making any creative efforts. Therefore, all technical solutions which persons skilled in the art come up with by performing logical analyses, inference or finite experiments and making reference to the prior art with a view to improving the present disclosure must fall into the scope of the claims of the present disclosure.

What is claimed is:

1. A mounting unit, comprising:
   a bottom portion having a first surface and a second surface;
   a cylinder portion centrally disposed at the bottom portion, protruding from the first surface or the second surface, and having a first screw hole;
   a plurality of abutting walls disposed at first edges of the bottom portion and extending from the first surface; and
   a plurality of lugs disposed at second edges of the bottom portion and extending from the second surface, wherein the plurality of lugs each have a second screw hole;
   wherein an inward dented portion dented in a direction of the cylinder portion is disposed at each of the plurality of abutting walls.

2. An assembly frame using a mounting unit, wherein the mounting unit comprising a bottom portion having a first surface and a second surface; a cylinder portion centrally disposed at the bottom portion, protruding from the first surface or the second surface, and having a first screw hole;

a plurality of abutting walls disposed at first edges of the bottom portion and extending from the first surface; and a plurality of lugs disposed at second edges of the bottom portion and extending from the second surface, wherein the plurality of lugs each have a second screw hole, the assembly frame comprising:

- a frame having a T-shaped slot insertable by the plurality of lugs of the mounting unit;
- a plurality of second screwing elements operating in conjunction with the second screw holes of the plurality of lugs to couple together the mounting unit and the frame;
- a screw coupled to the first screw hole of the cylinder portion of the mounting unit;
- a nut screwedly disposed at the screw and abutting directly or indirectly against the plurality of abutting walls of the mounting unit; and
- an end cover for covering the first surface of the mounting unit, the end cover having a surface portion, a cylindrical hole and a lateral portion, the cylindrical hole being penetrable by the screw.

3. An assembly frame using the mounting unit of claim 1, comprising:

- a frame having a T-shaped slot insertable by the plurality of lugs of the mounting unit;
- a plurality of second screwing elements operating in conjunction with the second screw holes of the plurality of lugs to couple together the mounting unit and the frame; and
- a screw coupled to the first screw hole of the cylinder portion of the mounting unit.

4. The assembly frame of claim 3, further comprising a nut screwedly disposed at the screw and abutting directly or indirectly against the plurality of abutting walls of the mounting unit.

5. The assembly frame of claim 4, further comprising an end cover for covering the first surface of the mounting unit, the end cover having a surface portion, a cylindrical hole and a lateral portion, the cylindrical hole being penetrable by the screw.

6. An assembly frame using a mounting unit, wherein the mounting unit comprises: a bottom portion having a first surface and a second surface; a cylinder portion centrally disposed at the bottom portion, protruding from the first surface or the second surface, and having a first screw hole; and a plurality of lugs disposed at edges of the bottom portion and extending from the second surface, wherein the plurality of lugs each have a second screw hole; the assembly frame comprising:

- a frame having a T-shaped slot insertable by the lugs of the mounting unit;
- a plurality of second screwing elements operating in conjunction with the second screw holes of the plurality of lugs to couple together the mounting unit and the frame;
- a screw coupled to the first screw hole of the cylinder portion of the mounting unit;
- a nut screwedly disposed at the screw and abutting directly or indirectly against the plurality of abutting walls of the mounting unit; and
- an end cover for covering the first surface of the mounting unit, the end cover having a surface portion, a cylindrical hole and a lateral portion, the cylindrical hole being penetrable by the screw.

\* \* \* \* \*